F. J. CORNELL.
MUD GUARD SUPPORT FOR MOTOR CYCLES OR LIKE VEHICLES.
APPLICATION FILED SEPT. 28, 1914.
1,144,463.
Patented June 29, 1915.
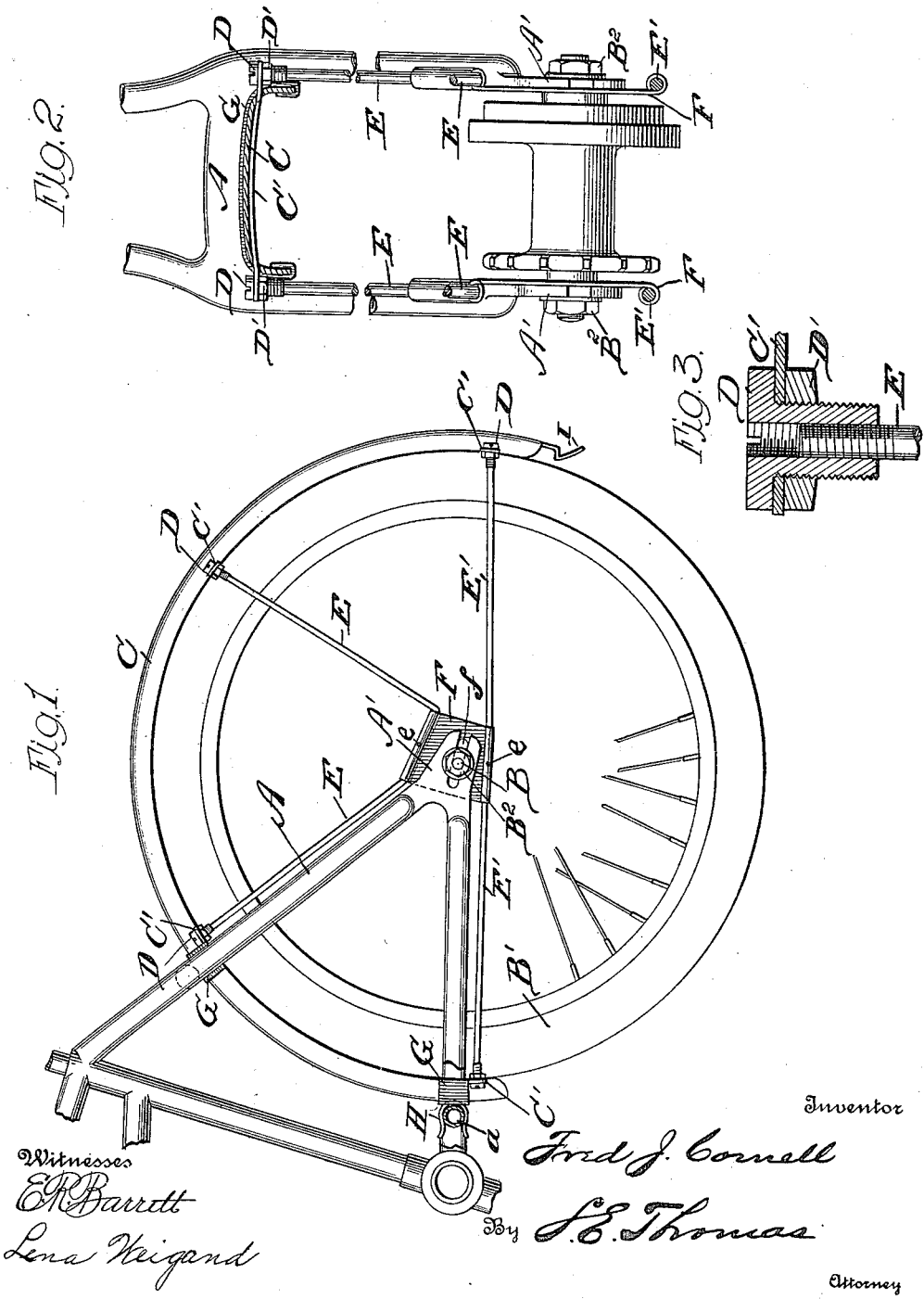

UNITED STATES PATENT OFFICE.

FRED J. CORNELL, OF DETROIT, MICHIGAN.

MUD-GUARD SUPPORT FOR MOTOR-CYCLES OR LIKE VEHICLES.

1,144,463.  Specification of Letters Patent.  Patented June 29, 1915.

Application filed September 28, 1914. Serial No. 863,828.

*To all whom it may concern:*

Be it known that I, FRED J. CORNELL, a citizen of the United States, residing at Detroit, county of Wayne, State of Michigan, have invented a certain new and useful Improvement in Mud-Guard Supports for Motor-Cycles or like Vehicles, and declare the following to be a full, clear, and exact description of the same, such as will enable others skilled in the art to which it pertains to make and use the same, reference being had to the accompanying drawings, which form a part of this specification.

My invention relates to means for attaching and supporting in position the mud guard of a motorcycle, bicycle, or other like vehicle.

One object is to provide a mudguard supporting frame embodying plates which may be removably secured to opposite ends of the axle of the vehicle to which rods may be connected and which have their outer ends connected by strips, by means of which the mudguard may be positioned and whereby, in the event of removal of the wheel for tire repairs or other purposes, the mud guard may be simultaneously removed and replaced with the wheel.

Another object resides in the provision of a mudguard supporting frame embodying among other characteristics plates adapted to be secured to opposite ends of one of the axles of the vehicle and to which rods are detachably connected, the outer ends of the rods being connected to strips adapted to pass through openings formed in the mudguard so as to support the mud guard on the supporting frame.

Other advantages and improvements will hereafter appear.

In the drawings accompanying this specification: Figure 1. is a fragmentary view of a motorcycle frame and rear axle, with a mud guard supported by the frame mounted upon the axle and adapted to be removed with the wheel. Fig. 2, is a fragmentary end elevation of a motorcycle with parts broken away, showing the mud guard and its supporting members in cross section. Fig. 3. is an enlarged cross sectional view through a fragment of the mud guard supporting strip, and frame, and the thimble and nut which secures the strip to the frame.

Referring now to the letters of reference placed upon the drawings: A, denotes the rear portion of a motorcycle frame of ordinary construction provided with the usual bifurcated portion A' to receive the axle B, of the wheel B'.

C, is a mud guard.

C', are supporting cross strips the ends of which project through openings provided in the inwardly turned edges of the mud guard.

D, denotes a thimble, internally and externally screw threaded, adapted to project through apertures in the ends of the strips C' to which it is engaged by a nut D'.

E, E', are rods the ends of which are screw threaded to engage the internal screw threaded portion of the thimbles D.

F, is a plate attached to the rods and held between the bifurcated portion A' of the forks and the hub of the wheel; the plate having a slot $f$, through which the axle B projects.

$B^2$, are nuts engaging the axle to secure it to the forks. The rods E, E', are secured to the plate F, by bending the edge of the latter around the rods, they may be further secured by suitable cross pins or rivets $e$. To protect the finish of the frame of the machine from injury through accidental contact with the mud guard, leather, or rubber strips G, may be attached to the guard at suitable points as indicated in Fig. 1.

H, is a spring clip secured to the mud guard adapted to engage the cross member $a$ of the frame.

I, is a spring clip attached to the rear end of the guard adapted to engage the usual supporting stand (not shown).

Having indicated the several parts by reference letters the construction of the device and its application and removal from the frame will be readily understood: To remove the wheel it is only necessary to release the nuts $B^2$, which secures the axle to the bifurcated portion of the fork. The mud guard and its supporting frame being mounted upon the axle of the wheel, it will be obvious that the wheel and mud guard may be removed by the same operation and thus the time and labor usually required to first remove the mud guard, that the wheel may be withdrawn from the frame is avoided. The nuts $B^2$, which engage the axle to the forks also serve to bind the plates F, between the forks and the hub of the wheel. The slot $f$, in the plates admit of their adjustment, whereby the mud guard may be fixed in concentric relation to the wheel;— the clip H, securing the mud guard against accidental shifting upon the axle.

Having thus described my invention what I claim is:—

1. In a vehicle of the character described including an axle, plates removably secured to the axle at opposite ends thereof, rods connected to each of said plates, the outer ends of the rods being screw threaded, thimbles having screw threaded connection with the outer ends of said rods, nuts operable on the body of the thimbles, strips clamped between the nuts and heads of the thimbles of opposite rods, and a mud guard provided with slots through which said strips project and by means of which the mud guard is secured to said strips.

2. In a vehicle of the character described including an axle, plates removably secured on the axle at opposite ends thereof, rods connected to each of said plates, strips connected to opposite rods, means for clamping the strips on the rods, and a mudguard having side flanges provided with slots through which said strips project and by means of which the mudguard is secured to said strips.

3. In a vehicle of the character described including an axle, plates removably secured on the axle at opposite ends thereof, rods connected to each of said plates above the axle, strips connected to opposite rods, means for clamping the strips on the rods, a mudguard having side flanges provided with slots through which said strips project and by means of which the mudguard is secured to said strips, and horizontally disposed rods connected to the lower edges of said plates below the axle and at their ends connected to the ends of the mudguard.

4. In a vehicle of the character described including an axle, plates removably secured on the axle at opposite ends thereof, rods connected to each of said plates above the axle, strips connected to opposite rods, means for clamping the strips on the rods, a mudguard having side flanges provided with slots through which said strips project and by means of which the mudguard is secured to said strips, horizontally disposed rods connected to the lower edges of said plates below the axle and at their ends connected to the ends of the mudguard, and a spring having connection with the vehicle frame and the inner lower end of the mudguard.

In testimony whereof, I sign this specification in the presence of two witnesses.

FRED J. CORNELL.

Witnesses:
SAMUEL E. THOMAS,
LENA WEIGAND.